Sept. 28, 1965 P. R. GUSTAFSSON ETAL 3,209,167

ARRANGEMENT FOR GENERATING EQUAL PULSE SEQUENCES

Filed May 21, 1962

INVENTORS
PER RAGNAR GUSTAFSSON
HOLGER LUDOLF MARCUS
BY Larson and Taylor
ATTORNEYS 3,209,167

ARRANGEMENT FOR GENERATING EQUAL PULSE SEQUENCES

Per Ragnar Gustafsson and Holger Ludolf Marcus, Lidingo, Sweden, assignors to Svenska Aktiebolaget Gasaccumulator, Lidingo, near Stockholm, Sweden, a corporation of Sweden Filed May 21, 1962, Ser. No. 196,167
Claims priority, application Sweden, June 13, 1961, 6,163/61
5 Claims. (Cl. 307—88.5)

In arrangements for generating sequences of pulses, there are sometimes relatively stringent requirements as to the time constancy of the sequences with regard to the length of the pulses and of the intervening intervals as well as with regard to the time spacing between the different sequences. In prior arrangements for generating this type of pulse sequences, attempts have been made to achieve with exactness a desired duration for the pulses and the intervening intervals and the accuracy with regard to the time spacing between the successive pulse sequences was then dependent on the accuracy of the duration of the component pulses and the intervening intervals. In unfavourable circumstances however, the possibility of an addition of the duration errors for all the component units must be considered, which might lead to the error in time spacing between the pulse sequences attaining prohibitive values.

The present invention relates to an arrangement for generating equal pulse sequences and which is of such a construction that the accuracy relative to the length of the period of the pulse sequences is entirely independent of the accuracy of the duration of the individual component pulses of a sequence and of the intervening interval between pulses.

According to the invention, the arrangement comprises a timing generator and a series of electrical multivibrators, the number of which equals the sum of the number of pulses and intervening intervals between pulses of a sequence, the first multivibrator being adapted to be started by a pulse from the timing generator and each subsequent multivibrator to be started by the multivibrator immediately before it in the series and every second multivibrator being adapted to trigger an output pulse of the pulse sequence from the arrangement.

Figure 1:
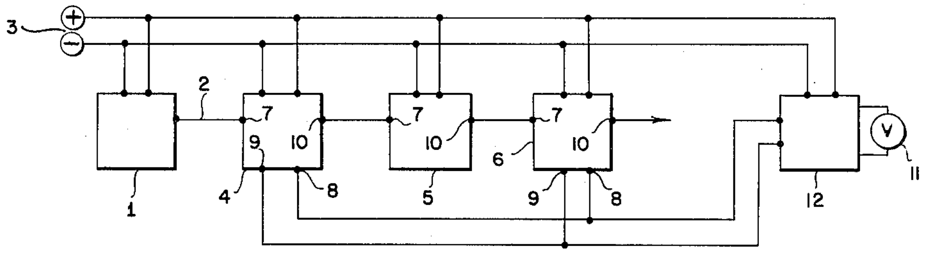

The invention will be described below with reference to the attached drawing showing an embodiment thereof. FIG. 1 shows a block diagram and FIG. 2 a circuit diagram in more detail.

In FIG. 1, 1 designates a timing generator of a construction which will be described in more detail below. Its output conductor 2 yields periodically recurring pulses, the polarity of which is in the present instance negative. The time spacing between these output pulses is dependent on the circuit elements of the generator 1 and may be of the order of ten or several tens of seconds. The generator 1 as well as the other elements of the arrangement obtain current from a current source 3, the positive and negative terminals of which have been shown on the drawing.

The output pulses from conductor 2 are applied to a first multivibrator 4 in a series of multivibrators comprising in the embodiment shown three multivibrators 4, 5 and 6. These are all monostable circuits, which means that an applied triggering pulse transfers a multivibrator from a passive state to another state from which the multivibrator returns automatically to its passive state after a predetermined time. The multivibrators 4 and 6 are of similar construction having an input terminal 7 and three output terminals 8, 9 and 10. The interior connections of the multivibrators are such as to make a positive pulse occur at the output terminal 8 when the multivibrator is transferred from the passive state to the other state referred to and to make a second positive pulse occur at the output terminal 9 upon the automatic return of the multivibrator from the other state to the passive state. The third output terminal 10 is connected so as to make a negative pulse occur at it upon the return of the multivibrator to the passive state.

The negative pulse occurring at the output terminal 10 of the multivibrator 4 is utilized to trigger the second multivbrator 5. This multivibrator has only one output terminal 10, at which a negative pulse occurs in the same manner as at the corresponding terminal 10 of the other multivibrators. The negative output pulse of the multivibrator 5 is used to trigger the multivibrator 6, and the negative pulse occurring at the output terminal 10 of this multivibrator can be used in the same manner to trigger a subsequent multivibrator of the series. The number of such multivibrators in a series depends on the number of pulses and intervening intervals between pulses that compose a pulse sequence.

In the embodiment shown, the positive pulses at the output terminals 8 and 9 are used for the switching on and off, respectively, of a lamp 11 with the aid of a relay member 12. The pulse at the output terminal 8 serves to ignite the lamp and the pulse at the terminal 9 to switch it off. The light interval of the lamp will therefore depend on the multivibrators 4, 6 etc., whereas the dark interval will be determined by the multivibrator 5 and, in the general case, by similarly positioned multivibrators of the series.

Figure 2:
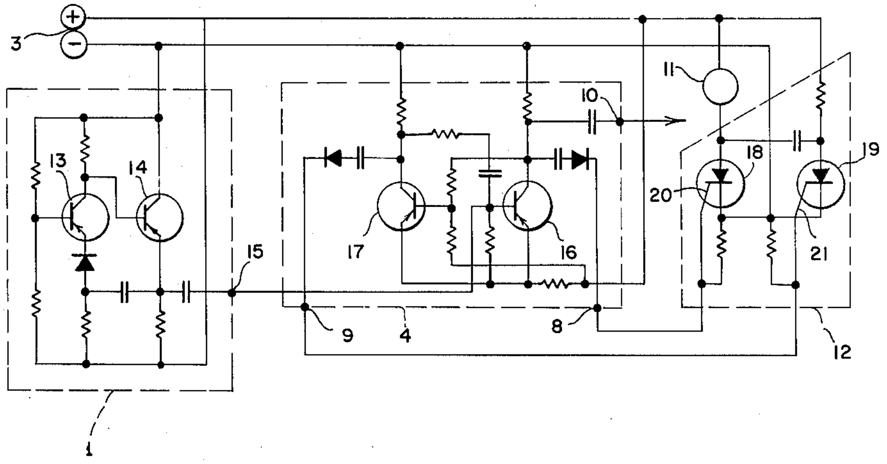

An example of a more detailed circuit diagram for the timing generator 1, multivibrator 4 and relay member 12 is shown in FIG. 2. The multivibrators 5 and 6 of FIG. 1 have not been indicated in FIG. 2, as they are assumed to be constructed in the same manner as the multivibrator 4 with the sole exception that the output terminals 8 and 9 are not present in the multivibrator 5.

The timing generator 1 in this case comprises two transistors 13 and 14 of the same type and connected together to form a free-running generator. The circuit elements of the arrangement are mutually proportioned so as to make a series of negative pulses appear at the output terminal 15 of the timing generator 1. The spacing between the pulses is equal to that between the initiations of two subsequent pulse sequences. This time interval, as was mentioned above, may be of the order of one or a few tens of seconds.

The series of negative pulses is applied to the first monostable multivibrator 4, which comprises two transistors 16 and 17 connected together by means of circuit elements indicated in the drawing so as to form a monostable multivibrator. The construction is selected so as to make the transistor 16 in the passive state of the multivibrator draw no current, whereby it is instantaneously transferred to its conductive state by a negative pulse applied to it from the output terminal 15. This causes a positive pulse to appear at the output terminal 8 of the multivibrator 4 and this pulse may be utilized in a manner to be described in more detail below for initiating the light period of the lamp 11.

After an interval which is determined by the component circuit elements of the multivibrator 4, it returns to its passive state, in which the transistor 16 is non-conductive. A negative pulse then appears at the output terminal 10 of the multivibrator 4, at the same time as the transistor 17 becomes conductive, which causes a positive pulse to appear at the output terminal 9. This pulse is utilized to terminate the light interval of the lamp 11 by means of the relay member 12.

It was mentioned above that the negative pulse at the output terminal 10 controls the next multivibrator, in the present instance the multivibrator 5, so as to transfer it from a passive state to another state, upon which the multivibrator 5 returns automatically to its passive state after a time determined by its circuit elements. Since the multivibrator 5 has no output terminals 8 and 9, a change-over occurring in the multivibrator 5 causes no pulses to be applied to the relay member 12. The multivibrator 5 will therefore determine the interval intervening between the light intervals of the lamp 11, whereas the light intervals are determined by the multivibrators 4 and 6.

In the embodiment of the invention shown diagrammatically in FIG. 2, the relay member 12 comprises two controlled rectifiers 18 and 19. These operate in a conventional manner, being normally non-conductive, and can be transferred to the conductive state by the application of a positive pulse of sufficient magnitude to the control electrode 20 or 21, respectively. A controlled rectifier which has been transferred in this manner to the conductive state remains conductive until an extinguishing impulse is applied, for instance in the form of a negative pulse applied to the electrode, shown on the drawing as an emitter, of the controlled rectifier.

In the relay member 12, the controlled rectifier 18 is in series with the lamp 11, so that when a positive pulse from any output terminal 8 arrives at the control electrode 20, this renders the rectifier 18 conductive and initiates the light interval of the lamp 11. The lamp then continues burning until the controlled rectifier 19 is rendered non-conductive by a positive pulse occurring at an output terminal 9. This causes an extinguishing pulse to be applied to the rectifier 18, which then interrupts the current flowing to the lamp 11 and terminates the light interval.

After an interval determined by the multivibrator 5, the multivibrator 6 starts and there appear at its output terminals 8 and 9 successive positive pulses, which switch the lamp 11 on and off. When the intended number of pulses has been applied to the lamp 11 and caused the corresponding number of light flashes, the arrangement remains passive until the next negative pulse is supplied from the timing generator 11. The sequence of events just described is then repeated, and a further pulse sequence is obtained from the arrangement.

It is apparent from this description of the operation of the arrangement, that the accuracy with regard to the time spacing between the initiations of successive pulse sequences is in no way dependent on the accuracy of the operating intervals of the various multivibrators 4, 5, 6, etc., of the timing generator of the arrangement. Irrespective of whether the pulse sequence contains a small or a large number of pulses separated by intervening intervals, it is therefore always possible to obtain the same high degree of exactness with regard to the spacing between the initiations of successive sequences.

The invention has been described with reference to an embodiment, but it is obvious that many modifications are possible within the scope of the following claims. It is apparent, for instance, that the timing generator may be of different construction and also that the various multivibrators may be differently constructed, as well as the relay member 12. It should however be noted that special advantages may be obtained if the multivibrators 4, 5 and 6, etc., are of mutually similar construction but differ, if required, with regard to the proportioning of the component elements, since this makes it possible to provide an arrangement in which the multivibrators are exchangeable in a simple manner. This provides facilities for altering the properties of the output pulse sequences in a simple way by inserting multivibrators having suitably proportioned circuit elements. Since the total sequence period duration then remains unchanged, it is possible in an arbitrary manner to compose the pulse sequence of pulses of a desired duration and having intervening intervals of arbitrary duration.

What we claim is:

1. An arrangement for generating periodically recurring similar pulse sequences with each sequence composed of a number of pulses and intervening intervals between the pulses, comprising a timing generator producing an uninterrupted series of pulses, the time spacing between a pair of successive pulses of the series being larger than the duration of each pulse sequence, a series of monostable multivibrators the number of which is equal to the sum of the number of pulses and of intervening intervals between the pulses of a sequence, means for applying a starting pulse from the timing generator to the first multivibrator of the series, and means for applying a starting pulse from each multivibrator to the subsequent multivibrator of the series, the output of each second multivibrator being connected to a relay member for initiating a pulse in the pulse sequence upon application of a pulse from said multivibrator to said relay member.

2. In an arrangement according to claim 1, wherein the said multivibrators are monostable multivibrators and each having an output terminal at which a pulse occurs upon the automatic return of the multivibrator to a passive state for application to a subsequent multivibrator in the series for activating the same.

3. In an arrangement according to claim 2, wherein every second multivibrator is additionally provided with two additional output terminals, a positive pulse occurring at one of said additional terminals upon the transfer of the multivibrator from the passive state and a positive pulse occurring at the other at said additional output terminals upon the automatic return of the multivibrator to its passive state.

4. In an arrangement according to claim 3 and further comprising a relay member connected to receive the positive pulses generated by said every second multivibrator, said relay being so connected that the first positive pulse from said one of said additional output terminals actuates said relay to apply current to a load and the second positive pulse from the other of said additional output terminals actuates said relay to interrupt said current to the load.

5. In an arrangement according to claim 4, wherein the relay member comprises a pair of control rectifiers, one of said rectifiers being in series with the load and responsive to said first positive pulse to cause current to flow to the load, and the other rectifier being responsive to said second positive pulse to render the first said controlled rectifier nonconductive so as to interrupt the supply of current to the load.

References Cited by the Examiner

UNITED STATES PATENTS 2,567,844 9/51 Golian ---------------- 328—62 X

OTHER REFERENCES

Solid State Products, Inc., Applications and Circuit Design Notes, August 1959, Bulletin D4 20—02.

JOHN W. HUCKERT, *Primary Examiner.*

ARTHUR GAUSS, *Examiner.*